United States Patent [19]
Hughes et al.

[11] Patent Number: 5,391,840
[45] Date of Patent: Feb. 21, 1995

[54] INSULATED DUCT

[75] Inventors: John T. Hughes; Michael E. Smith, both of Worcester, United Kingdom

[73] Assignee: Zortech International Limited, Worcestershire, United Kingdom

[21] Appl. No.: 983,087

[22] Filed: Nov. 19, 1992

[30] Foreign Application Priority Data

Nov. 28, 1991 [GB] United Kingdom ................ 9125323

[51] Int. Cl.⁶ .......................... H02G 3/04; F16L 59/02
[52] U.S. Cl. ............................ 174/68.3; 174/99 R; 174/101; 138/149; 138/155; 138/158; 138/167
[58] Field of Search .................. 174/68.3, 68.1, 72 R, 174/95, 96, 97, 98, 99 R, 101; 109/24; 156/77; 138/130, 149, 155, 158, 167

[56] References Cited
U.S. PATENT DOCUMENTS

| | | | |
|---|---|---|---|
| 1,618,455 | 2/1927 | Lindsay | 138/149 |
| 3,818,949 | 6/1974 | Johnson | 138/158 |
| 4,122,203 | 10/1978 | Stahl | 156/77 X |
| 4,467,914 | 8/1984 | Trammel et al. | 138/155 X |
| 4,493,945 | 1/1985 | Feldman | 174/68.3 |
| 4,564,547 | 1/1986 | Hughes | 156/276 X |
| 4,584,214 | 4/1986 | Eiermann | 174/99 X |
| 4,585,070 | 4/1986 | Garrido | 169/48 |
| 4,729,916 | 3/1988 | Feldman | 428/182 |
| 4,732,796 | 3/1988 | Schatchneider | 138/149 X |

FOREIGN PATENT DOCUMENTS

| | | | |
|---|---|---|---|
| 0091255 | 10/1983 | European Pat. Off. . | |
| 3014695 | 10/1981 | Germany | 174/68.3 |
| 3941095 | 5/1991 | Germany | 174/96 |
| 2027155 | 2/1980 | United Kingdom . | |
| 2144675 | 3/1985 | United Kingdom . | |
| 2211466 | 7/1989 | United Kingdom . | |
| 2214261 | 8/1989 | United Kingdom . | |
| 0576636 | 10/1977 | U.S.S.R. | 174/68.3 |

Primary Examiner—Leo P. Picard
Assistant Examiner—Hyung S. Sough
Attorney, Agent, or Firm—Ira S. Dorman

[57] ABSTRACT

An insulated duct, for example for electric cables, comprises first and second co-operable members forming a duct therebetween and toggle clips to secure the first and second members together such that the first and second members are urged towards each other. Each member comprises a base of thermal insulation material and at least one wall portion of thermal insulation material extending from the base of at least one of the members. An external skin is provided on the thermal insulation material, and an internal lining is provided on the thermal insulation material. The thermal insulation material, the external skin and the internal lining of the first member are dimensioned substantially to abut against the thermal insulation material, the external skin and the internal lining respectively of the second member.

21 Claims, 3 Drawing Sheets

INSULATED DUCT

The present invention relates to an insulated duct which may be used, for example, for carrying electric cables.

BACKGROUND TO THE INVENTION

Insulated ducts for electric cables, so-called insulated cable trays, are used in situations where it is important that electric cables should not be damaged in the early stages of a fire, for example in conventional and nuclear power stations or in offshore installations. Such insulated ducts are generally installed in a multiple stage process in which the cables are first attached to a cable tray, which tray is then encased in thermal insulation material and subsequently attached to the installation. Such an installation process is both time-consuming and costly.

OBJECT OF THE INVENTION

It is an object of the present invention to provide an insulated duct, for example for carrying electric cables, which can be installed quickly and economically.

SUMMARY OF THE INVENTION

According to the present invention there is provided an insulated duct comprising first and second co-operable members forming a duct therebetween and means to secure the first and second members together such that the first and second members are urged towards each other, wherein: each member comprises a base of thermal insulation material;

at least one wall portion of thermal insulation material extends from the base of at least one of the members;

an external skin is provided on the thermal insulation material; and an internal lining is provided on the thermal insulation material, the thermal insulation material, the external skin and the internal lining of the first member being adapted substantially to abut against the thermal insulation material, the external skin and the internal lining respectively of the second member.

The thermal insulation material may be load bearing.

Wall portions of thermal insulation material may extend from the base of both the first and second co-operable members.

The external skin may be selected from the group consisting of stainless steel and galvanised steel.

The external skin may be secured to the thermal insulation material, for example by a synthetic resin material.

The internal lining may be selected from the group consisting of stainless steel and galvanised steel.

The internal lining may be secured to the thermal insulation material, for example by a synthetic resin material.

The internal lining of one of the first and second members may be provided with supports, for example for one or more cables.

The level of the thermal insulation material of at least one of the first and second members may be such that, prior to assembly of the duct, the thermal insulation material protrudes beyond the level of the external skin and the internal lining of the at least one member.

The means for securing the first and second members together may comprise a plurality of toggle clips.

At least one rivet may extend through the external skin, the thermal insulation material and the internal lining of at least one of the first and second co-operable members.

The thermal insulation material may comprise a microporous thermal insulation material which may be compacted into a cellular reinforcing structure. Optionally, the microporous thermal insulation material may be provided on at least one face thereof with a surface layer which may be selected from the group consisting of aluminium foil, paper and synthetic resin material.

At least one of the first and second members may be provided with locating means at each end thereof, the locating means being adapted to align adjoining sections of insulated duct. The locating means may comprise a locating pin at one end of the member and means for defining a locating aperture at the other end of the member.

Means, such as at least one toggle clip, may be provided for securing the insulated duct to an adjoining insulated duct.

Means, such as an L-shaped bracket and/or a plate provided with a threaded stud and secured to the external skin, may be provided for securing the duct to a support member.

For a better understanding of the present invention and to show more clearly how it may be carried into effect reference will now be made, by way of example, to the accompanying drawings in which:

DESCRIPTION OF PREFERRED EMBODIMENTS

Figure 1:
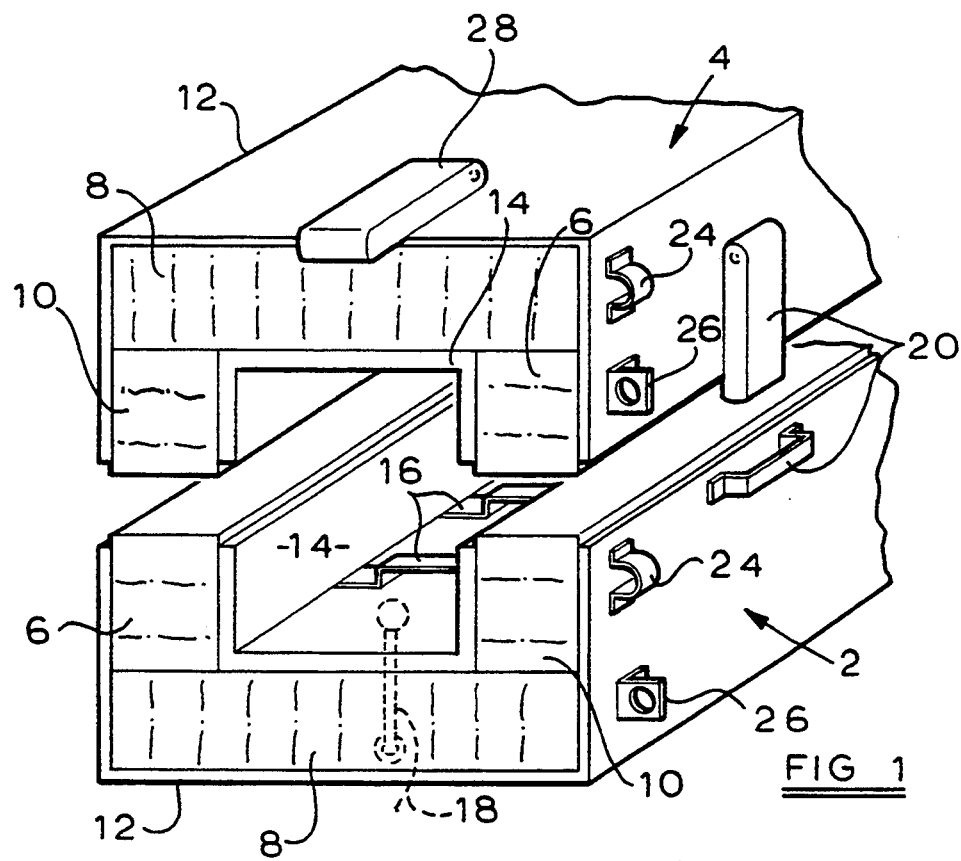
FIG. 1 is an exploded diagrammatic perspective view of one end of one embodiment of an insulated duct according to the present invention.
Figure 2:
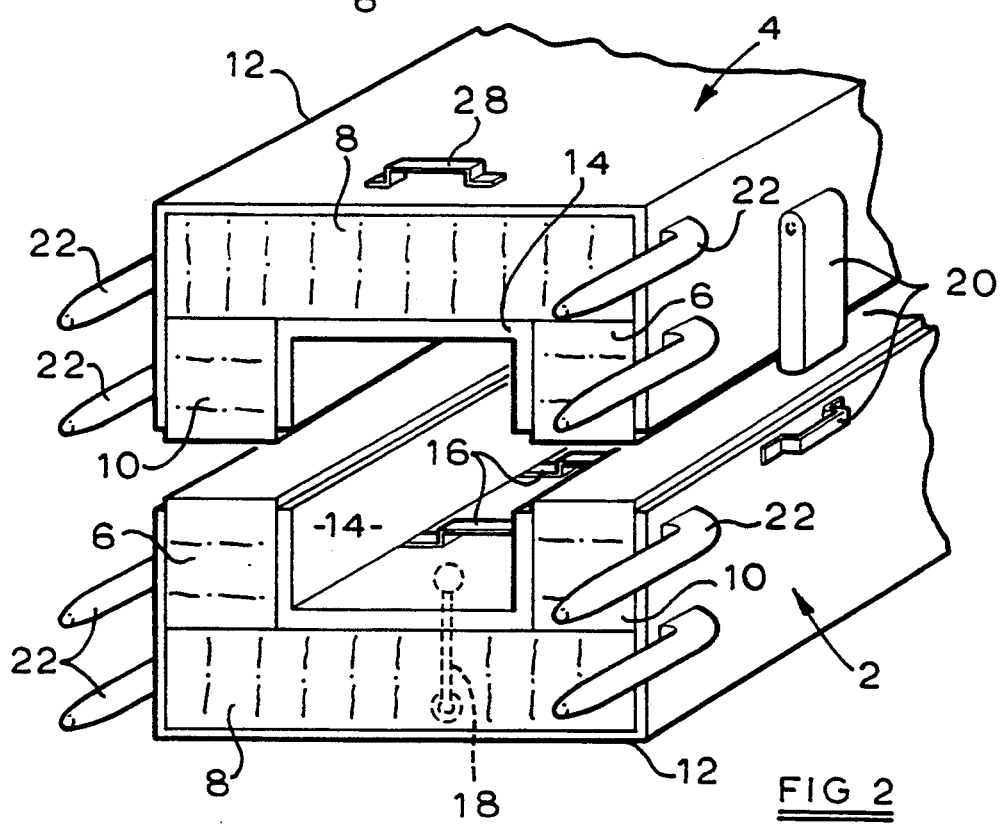
FIG. 2 is an exploded diagrammatic perspective view of the other end of the insulated duct shown in FIG. 1.

The insulated duct shown in FIGS. 1 and 2 comprises first and second substantially identical channel members 2, 4 respectively. The channel members 2, 4 include a load-bearing thermal insulating core made of one or more elements of thermal insulation material, elements 6, 8 and 10 being shown in the figures. The core is provided with an outer skin 12, for example of stainless or galvanised steel and having a thickness of about 0.5 mm, and with an inner cable duct 14 which may also be made of stainless or galvanised steel, the outer skin 12 and the inner cable duct being secured to the core, for example using a suitable glue such as a two-part polyurethane resin. The inner cable duct 14 of one of the channel members, in the illustrated embodiment-channel member 2, has a plurality of cable supports 16 fastened therealong in a spaced manner, for example by spot-welding. The cable supports 16 incorporate leg portions and a bar portion, the leg portions spacing the bar portion from the inner cable duct 14 to facilitate securing one or more electric cables (not shown in FIGS. 1 and 2) or the like to the bar portions of the cable supports spaced along the inner cable duct 14. The thickness of the inner cable duct depends on the thermal mass required for assisting in the control of the temperature of the inner cable duct and the components contained therein, but we have found a thickness of about 3 mm to be generally satisfactory.

The load-bearing thermal insulating core may be made of a number of thermal insulating materials, but the preferred material is a cellular or honeycomb reinforced microporous thermal insulation material such as that described in GB-A-2 144 675.

The term 'microporous' is used herein to identify porous or cellular materials in which the ultimate size of the cells or voids is less than the mean free path of an air molecule at NTP, i.e. of the order of 100 nm or smaller. A material which is microporous in this sense will exhibit very low transfer of heat by air conduction (that is collisions between air molecules). Such microporous materials include aerogel, which is a gel in which the liquid phase has been replaced by a gaseous phase in such a way as to avoid the shrinkage which would occur if the gel were dried directly from a liquid. A substantially identical structure can be obtained by controlled precipitation from solution, the temperature and pH being controlled during precipitation to obtain an open lattice precipitate. Other equivalent open lattice structures include pyrogenic (fumed) and electrothermal types in which the average ultimate particle size is less than 100 nm. Any of these materials, based for example on silica, alumina or other metal oxides, may be used to prepare a composition which is microporous as defined above.

The microporous thermal insulating material used in the invention preferably comprises a mixture of highly dispersed pyrogenic silica, alumino-silicate fibre reinforcement and rutile powder opacifier, mixed together in known manner. The mixture is made by mixing the constituents of the insulating material in the following exemplary proportions by weight:

Pyrogenic silica 65%
Ceramic fibre 1%
Rutile powder 34%

The silica may have a waterproof surface coating applied thereto to render the insulation mixture water resistant.

The insulating mixture is poured over a cellular reinforcing structure, such as a honeycomb structure, in an amount corresponding to approximately five times the volume occupied by the cellular structure and is compacted into the cells of the structure. The material of the cellular structure may be selected from a large number of materials including, for example, metals such as aluminium foil, inorganic materials such as ceramics, or organic materials such as plastics materials, woven fabrics or paper. The structure may also be made from a combination of materials. If the material has a low inherent rigidity, additives may be employed. For example, paper may be stiffened with phenolic resin.

A skin is applied to the faces of the cellular structure having the microporous thermal insulating material compacted therein to form a handleable panel. The skin may be of metal, such as aluminium foil, plastics, woven or non-woven fabric bonded to the honeycomb structure using a suitable glue such as a two-part polyurethane resin or the skin may itself comprise a two-part polyurethane resin which is applied to a face of the cellular structure, for example on a sheet of polyethylene plastics material which can be removed after the resin has cured. If desired, opposite faces of the cellular structure may be provided with different forms of skin. We have found that such a panel provides a lightweight, high-strength load-bearing thermal insulation material having very low thermal conductivity. Strength is imparted to the panel because residual pressure in the thermal insulation material causes the material to bear against the walls of the cellular structure. This residual pressure also assists the panel in resisting the penetration of fire because if the material of the cellular structure is destroyed at the hot face of the panel, the residual pressure causes the thermal insulation material to expand and to close the gap created by the disappearance of the cellular structure, thus protecting the remainder of the cellular structure.

As shown in FIGS. 1 and 2, the insulating material is made of three sections 6, 8 and 10 of honeycomb reinforced microporous thermal insulation material as described above to form a generally U-shaped insulating member, the honeycomb structure being indicated by dash-dot lines. The thickness of the insulation depends on the material and its intended use, but we have found that 40 mm is generally satisfactory for hydrocarbon fires. The legs of the insulating member are dimensioned to project a short distance, of the order of 1 mm, above the level of the outer skin 12 and the inner cable duct 14. This is to ensure, when the two channel members 2, 4 are secured together, that the seal between the members 2, 4 is between the insulation material rather than the outer skins 12 or the inner cable ducts 14 so as to avoid as far as possible any heat leakage into the interior of the channel members. If desired, as shown in dashed lines in FIG. 1, the outer skin 12 and the inner cable duct 14 may be secured together through the insulation material by one or more rivets 18.

The two channel members 2, 4 are secured together to form an insulated duct in which the outer skins 12 and the inner cable ducts 14 are essentially continuous by any suitable means spaced along the length of the channel members, such as toggle clips 20 shown in FIG. 1, so as to compress the insulation material and to urge the outer skin and the internal lining of the two channel members towards each other. Toggle clips 20 permit the channel members 2, 4 readily to be secured together, while permitting the members 2, 4 subsequently to be separated, for example for maintenance work to be carried out on the cables within the insulated cable duct. The outer skin 12, the insulation material and the inner cable duct 14, because they are each urged against a corresponding element, all impart considerable structural strength to the insulated duct.

The length of each insulated duct section may be of the order of 2 meters, with adjoining duct sections being located by means of pegs on one section being located in corresponding apertures provided on the other section. To accomplish this location, as shown in FIG. 2, one end of each duct section is provided with one or more pins 22, two pins being provided in the illustrated embodiment. The other end of each duct section, as shown in FIG. 1, is provided with a corresponding number of locating apertures. Two alternative versions of the locating apertures are shown in FIG. 1, the upper locating aperture being formed by a U-shaped element 24 secured to the outer skin 12, and the lower locating aperture being formed by an aperture provided in an L-shaped element 26 secured to the outer skin 12.

When the duct sections have been located in their longitudinal direction, the sections are secured together by any suitable means such as toggle clips 28 so as to compress the insulation material and to urge the outer skin and the internal lining of the two duct sections towards each other. As with the toggle clips 20, the toggle clips 28 permit the duct sections readily to be secured together, while permitting the sections subsequently to be separated, for example for maintenance work to be carried out on the cables within the insulated cable duct.

The length of the insulating members is dimensioned to project a short distance, of the order of 1 mm, beyond each end of the outer skin 12 and the inner cable duct 14. This is to ensure, when the duct sections are secured together longitudinally, that the seal between the sections is between the insulation material rather than the skins 12 or the ducts 14 so as to avoid as far as possible any heat leakage into the interior of the channel members.

Figure 3:
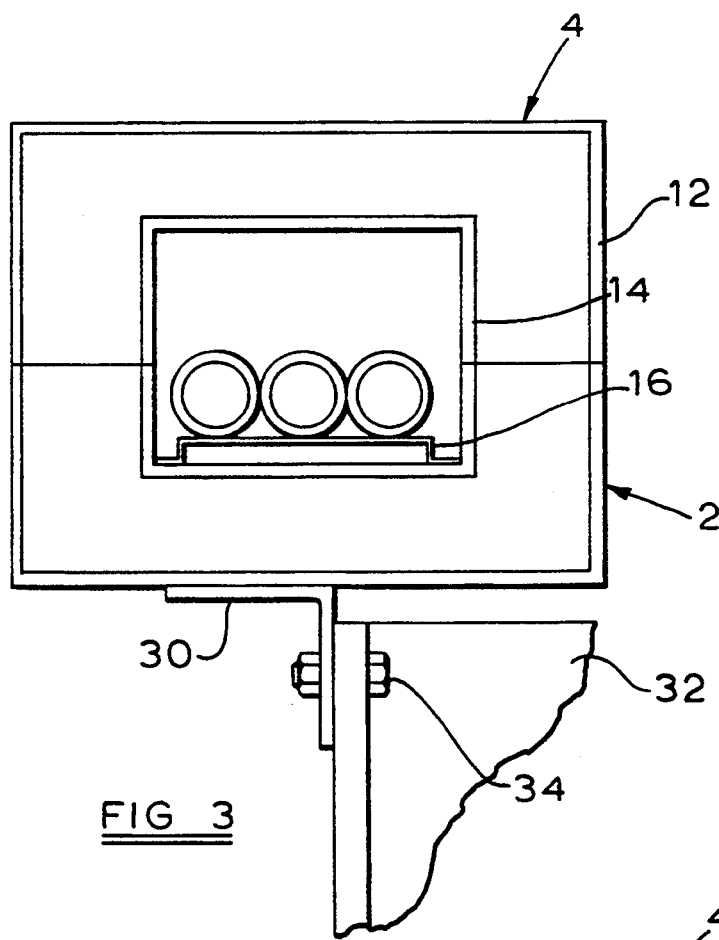
FIG. 3 is a diagrammatic illustration of one method of securing the insulated duct according to the present invention to a supporting structure.
Figure 4:
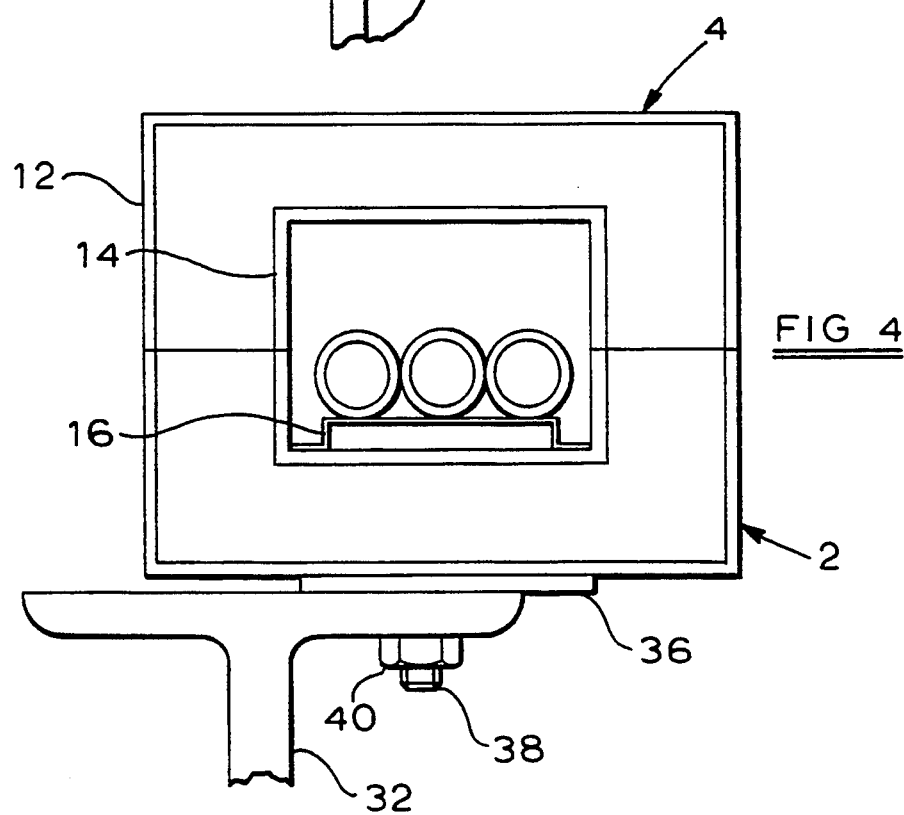
FIG. 4 is a diagrammatic illustration of another method of securing the insulated duct according to the present invention to a supporting structure.

The insulated cable duct may be secured to a supporting structure in many ways, the large number of alternatives being made possible by the structure of the insulating duct which enables the duct to be supported solely by way of the outer skin 12. FIG. 3 illustrates that a plurality of L-shaped brackets 30 can be secured to the outer skin 12, for example by way of blind rivets or screws (not shown), at suitable positions, the brackets 30 being mounted on the supporting structure 32 by means of bolts 34 or the like. FIG. 4 illustrates another possibility in which a plate 36 carrying a stud 38 is mounted on the outer skin 12, for example by way of blind rivets or screws (not shown), the stud 38 being secured to the supporting structure 32, such as an I-beam, by means of a nut 40. The ability of the insulated duct according to the present invention to be secured to a supporting structure by means such as that shown in FIGS. 3 and 4 which can be mounted on the insulated duct at the time the duct is secured to the supporting structure results in a particularly flexible installation procedure which can readily be adapted to any individual problems that may be encountered during installation.

Figure 5:
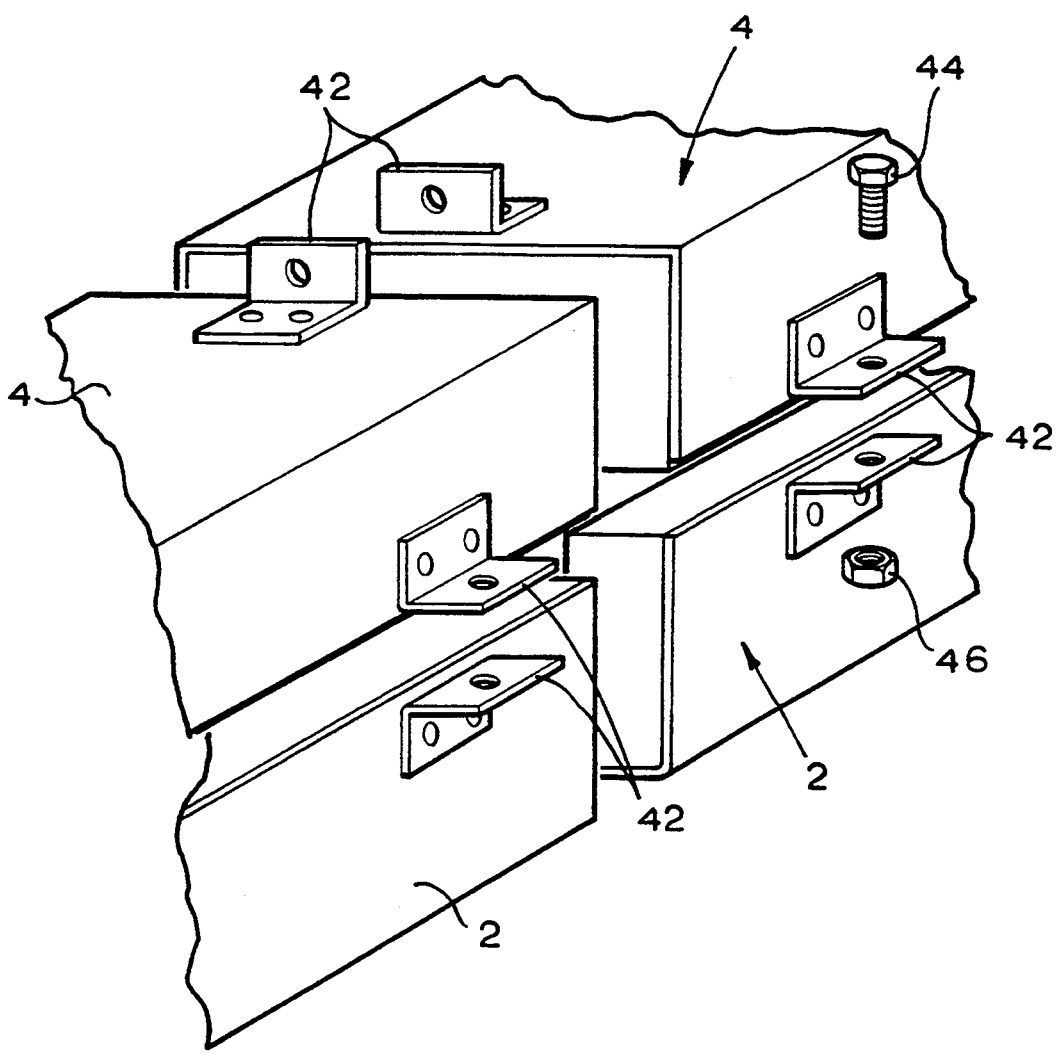
FIG. 5 is an exploded view of part of another embodiment of an insulated duct according to the present invention.

The insulated duct shown in FIG. 5 is similar to that shown in FIGS. 1 and 2 and the same reference numerals are used to denote the same or similar components. Instead of using toggle clips 20 to secure the upper and lower channel members 2, 4 together and using toggle clips 28 in conjunction with pins 22 engaging in apertures in element 24 or 26 to secure the duct sections together, a more simple securing means is employed. The securing means employed in FIG. 5 comprises L-shaped brackets 42 secured to the upper and lower channel members 2, 4, for example by blind rivets, the L-shaped brackets being secured together by means of a bolt 44 and nut 46. Furthermore, the L-shaped shaped brackets 42 are also used to secure the duct sections together as shown diagrammatically in FIG. 5, with or without the pins 22 and elements 24 or 26.

While the insulated duct according to the present invention has been described and shown in the drawings as comprising two substantially identical channel members, it is not essential to the invention that the members be identical, although identical channel members generally give rise to more simple manufacturing techniques. In alternative forms of the insulated duct, for example, one member may be generally U-shaped while the other member is substantially planar. In addition to alternative forms for the channel members, the insulation need not necessarily comprise a honeycomb-reinforced microporous thermal insulation material, but may alternatively comprise microporous thermal insulation material moulded directly into the channel members, or other, non-microporous load-bearing thermal insulation material, such as calcium silicate, which permits the inner cable duct and the outer skin to be bonded to the insulation material. Such materials permit the channel members to be cut and shaped and allow supporting brackets to be secured, for example by riveting, substantially anywhere on the surface thereof.

We claim:

1. A duct assembly comprised of a plurality of open-ended insulated ducts, each of said ducts comprising first and second cooperable members forming a duct therebetween, and means to secure the first and second members together such that the first and second members are urged towards each other, wherein:

each member comprises a base of load-bearing thermal insulation material;

at least one wall portion of load-bearing thermal insulation material extends from the base of at least one of the first and second members;

an external skin is provided on the thermal insulation material; and an internal lining is provided on the thermal insulation material, the thermal insulation material of the first member abutting in direct surface contact against the thermal insulation material of the second member, the external skin of the first member abutting directly against the external skin of the second member, and the internal lining of the first member abutting directly against the internal lining of the second member, and the thermal insulation material of the first and second members being maintained under compression, said duct thereby comprising substantially continuous layers, extending thereabout, of each of said thermal insulation material, said external skin, and said internal lining; said ducts further including means for securing said ducts together in end-to-end assembly such that the assembled ducts are urged towards each other with an end portion of said insulation material at the open end of one of said ducts in sealing contact with an end portion of said insulation material of another of said ducts, at least one of said first and second members of each of said ducts having locating means externally disposed at each end thereof for facilitating assembly of said ducts, and said assembly being devoid of any element interposed between said contacting end portions of insulation material of said one and another ducts.

2. A duct assembly according to claim 1, wherein the wall portions of the thermal insulation material extend from the base of both the first and second co-operable members.

3. A duct assembly according to claim 1, wherein the external skin is selected from the group consisting of stainless steel and galvanised steel.

4. A duct assembly according to claim 1, wherein the external skin is secured to the thermal insulation material.

5. A duct assembly according to claim 4, wherein the external skin is secured to the thermal insulation material by a synthetic resin material.

6. A duct assembly according to claim 1, wherein the internal lining is selected from the group consisting of stainless steel and galvanised steel.

7. A duct assembly according to claim 1, wherein the internal lining is secured to the thermal insulation material.

8. A duct assembly according to claim 7, wherein the internal lining is secured to the thermal insulation material by a synthetic resin material.

9. A duct assembly according to claim 1, wherein the internal lining of one of the first and second members is provided with supports.

10. A duct assembly according to claim 1, wherein the level of the thermal insulation material of at least one of the first and second members is such that, prior to assembly of the duct, the thermal insulation material protrudes beyond the level of the external skin and the internal lining of the at least one member.

11. A duct assembly according to claim 1, wherein the means for securing the first and second members together comprises a plurality of toggle clips.

12. A duct assembly according to claim 1, wherein at least one rivet extends through the external skin, the thermal insulation material and the internal lining of at least one of the first and second co-operable members.

13. A duct assembly according to claim 1, wherein the thermal insulation material comprises a microporous thermal insulation material.

14. A duct assembly according to claim 13, wherein the microporous thermal insulation material is compacted into a cellular reinforcing structure.

15. A duct assembly according to claim 13, wherein the microporous thermal insulation material is provided on at least one face thereof with a surface layer.

16. A duct assembly according to claim 15, wherein the surface layer is selected from the group consisting of aluminium foil, paper and synthetic resin material.

17. A duct assembly according to claim 1, wherein the locating means comprises a locating pin at one end of the member and means for defining a locating aperture at the other end of the member.

18. A duct assembly according to claim 1, wherein the means for securing said ducts together comprises at least one toggle clip.

19. A duct assembly according to claim 1, wherein means is provided for securing the duct to a support member.

20. A duct assembly according to claim 19, wherein the means for securing the duct to a support member comprises an L-shaped bracket secured to the external skin.

21. A duct assembly according to claim 19, wherein the means for securing the duct to a support member comprises a plate provided with a threaded stud and secured to the external skin.

* * * * *